Patented Feb. 17, 1953

2,628,987

UNITED STATES PATENT OFFICE 2,628,987

1,3-DICHLORO-2,3,3-TRIFLUOROPROPENE

Robert P. Ruh, Midland, Mich., assignor to The Dow Chemical Company, Midland, Mich., a corporation of Delaware No Drawing. Application May 26, 1950,
Serial No. 164,613

1 Claim. (Cl. 260—653)

This invention relates to the preparation of 1,3-dichloro-2,3,3-trifluoropropene.

1,3-dichloro-2,3,3-trifluoropropene is a chemical compound not known prior to my invention; this material is differentiated from related previously known compounds by its unexpected utility as an extremely effective fumigant. Its physical characteristics, e. g., high volatility, make its use as a space fumigant or as a package fumigant particularly advantageous. The killing power of the compound is entirely unexpected.

The compound of the invention is conveniently prepared by dechlorination of 1,1,2,3-tetrachloro-2,3,3-trifluoropropane. The dechlorination is conveniently effected by contacting the starting material with zinc in the presence of an alcohol solvent for zinc chloride formed in the course of the dechlorination. The zinc is usually granular, powdered or mossy. The solvent is used to prevent the formation of a zinc chloride coating on the zinc; such coating hinders the effectiveness of the zinc as a dechlorinating agent. In general, alcohols (i. e., compounds having the general formula ROH, where R is an alkyl radical) are effective solvents for the zinc chloride so formed; ethanol is particularly advantageous because of its availability, low toxicity, and cost. Preferably the alcohol has not more than four carbon atoms. Since the dechlorination is highly exothermic, the substituted propane is usually added dropwise to avoid an unduly violent reaction. It is helpful to reflux the mixture remaining after addition of the substituted propane in order to assure complete reaction. Ordinarily, it is desired to use an excess (e. g., from 5 to 50 per cent) of zinc to effect dechlorination.

The following example illustrates the preparation of 1,3-dichloro-2,3,3-trifluoropropene, and the use thereof as a fumigant, but is not to be construed as limiting the invention:

Example

Granular zinc (39 grams) was placed in a flask fitted with a reflux condenser and was covered with 50 cc. of absolute ethanol. 1,1,2,3-tetrachloro-2,3,3-trifluoro propane (118 grams) was dissolved in 75 cc. of absolute ethanol, and the resulting solution was added dropwise to the zinc-ethanol mixture in the flask. The rate of addition was controlled to avoid violent refluxing; when the addition was complete, the reaction mixture was refluxed for about 90 minutes. The excess of ethanol was dissolved in water, and the organic layer was separated from the aqueous layer and dried over anhydrous calcium chloride. By careful fractionation of the crude product two geometric isomers of the desired product were obtained. One isomer had the following physical properties: boiling point 58° C. at 748 mm. Hg; $n_D^{25°}$ 1.3701; density at 25° C. 1.4643 grams per cc.; molecular refraction found 25.42: theory 25.20. The other isomer had the following physical properties: boiling point 67° C. at 748 mm. Hg; $n_D^{25°}$ 1.3825; density at 25° C. 1.4955 grams per cc.; molecular refraction found 25.70: theory 25.20.

Each of the isomers of 1,3-dichloro-2,3,3-trifluoropropene was tested as a fumigant by placing caged black carpet beetle larvae and confused flour beetle adults in a fumigation vault, and admitting a measured amount of the propene into the vault. Both isomers, in concentrations as low as 0.5 pound per 1000 cubic feet, were 100 per cent effective against the two species after 16 hour exposures.

I claim:

1,3-dichloro-2,3,3-trifluoropropene.

ROBERT P. RUH.

REFERENCES CITED

The following references are of record in the file of this patent:

UNITED STATES PATENTS

| Number | Name | Date |
|---|---|---|
| 2,344,061 | Renoll | Mar. 14, 1944 |
| 2,404,706 | Harmon | July 23, 1946 |